United States Patent
Dornich et al.

(10) Patent No.: US 9,635,069 B2
(45) Date of Patent: Apr. 25, 2017

(54) USER FEEDBACK SYSTEMS AND METHODS

(71) Applicant: Verizon Patent and Licensing Inc., Arlington, VA (US)

(72) Inventors: William M. Dornich, Flower Mound, TX (US); Richard M. Vandoren, Walnut Creek, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 14/452,957

(22) Filed: Aug. 6, 2014

(65) Prior Publication Data
US 2016/0044112 A1   Feb. 11, 2016

(51) Int. Cl.
G06F 15/173 (2006.01)
H04L 29/06 (2006.01)
H04M 3/00 (2006.01)
H04M 3/42 (2006.01)

(52) U.S. Cl.
CPC ...... H04L 65/1096 (2013.01); H04L 65/1069 (2013.01); H04M 3/00 (2013.01); H04M 3/42017 (2013.01)

(58) Field of Classification Search
CPC ... H04L 67/141; H04L 67/02; H04L 65/1096; H04L 65/1069; H04M 3/00; H04M 3/42017
USPC ......................................... 709/227, 226, 229
See application file for complete search history.

(56) References Cited

U.S. PATENT DOCUMENTS

| | | | | |
|---|---|---|---|---|
| 3,896,432 | A * | 7/1975 | Young | G01C 23/005 342/182 |
| 5,519,768 | A * | 5/1996 | Moquin | H04M 3/4228 379/100.01 |
| 7,450,119 | B2 * | 11/2008 | Eckstein | G06T 1/20 345/420 |
| 7,813,490 | B2 * | 10/2010 | DeMent | H04M 3/42017 379/221.03 |
| 7,913,185 | B1 * | 3/2011 | Benson | G06F 8/38 715/762 |
| 2002/0004831 | A1 * | 1/2002 | Woodhill | G06F 21/313 709/229 |
| 2005/0083314 | A1 * | 4/2005 | Shalit | G06F 1/1626 345/179 |
| 2005/0117726 | A1 * | 6/2005 | DeMent | H04M 3/42017 379/142.01 |
| 2006/0023862 | A1 * | 2/2006 | Sutcliffe | H04M 3/42017 379/257 |
| 2006/0026277 | A1 * | 2/2006 | Sutcliffe | H04M 1/57 709/224 |
| 2007/0007331 | A1 * | 1/2007 | Jasper | G06Q 20/20 235/379 |

(Continued)

*Primary Examiner* — Thu Ha Nguyen

(57) ABSTRACT

An exemplary method includes detecting, by a user feedback system, ring-back content provided to a first computing device during a connection period prior to beginning a communication session between the first computing device and a second computing device, and providing, by the user feedback system in conjunction with the detecting of the ring-back content provided to the first computing device, a feedback mechanism that facilitates a user of the first computing device providing feedback regarding the ring-back content. Corresponding systems and methods are also described.

20 Claims, 10 Drawing Sheets

(56) References Cited

U.S. PATENT DOCUMENTS

| | | | |
|---|---|---|---|
| 2007/0143398 A1* | 6/2007 | Graham | G06Q 40/02 709/204 |
| 2007/0207782 A1* | 9/2007 | Tran | H04L 29/06027 455/414.1 |
| 2007/0269032 A1* | 11/2007 | Ohno | H04M 3/42017 379/201.01 |
| 2007/0291931 A1* | 12/2007 | DeMent | H04M 3/42017 379/418 |
| 2008/0063168 A1* | 3/2008 | Haley | H04M 3/42017 379/201.01 |
| 2008/0124694 A1* | 5/2008 | Miller | G09B 5/00 434/262 |
| 2008/0222004 A1* | 9/2008 | Pollock | G06Q 30/0603 705/15 |
| 2009/0214003 A1* | 8/2009 | Yan | H04M 3/02 379/87 |
| 2010/0114974 A1* | 5/2010 | Jung | G06F 3/016 707/802 |
| 2010/0306061 A1* | 12/2010 | Wagner | G06Q 30/02 705/14.66 |
| 2011/0173235 A1* | 7/2011 | Aman | A63B 24/0021 707/792 |
| 2013/0044801 A1* | 2/2013 | Cote | H04N 19/146 375/240.01 |
| 2013/0304587 A1* | 11/2013 | Ralston | G06Q 30/0271 705/14.67 |
| 2014/0066026 A1* | 3/2014 | Vogedes | H04M 3/4288 455/413 |
| 2015/0133095 A1* | 5/2015 | Sutcliffe | H04W 4/18 455/414.1 |

\* cited by examiner

USER FEEDBACK SYSTEMS AND METHODS

BACKGROUND INFORMATION

The proliferation of computing devices (e.g., mobile phones, tablet computers, laptop computers, etc.) in modern society has provided users with numerous opportunities and ways to access and/or share digital content (e.g., media content such as pictures, videos, songs, etc.). In addition, users have been provided with conventional mechanisms for providing feedback about such digital content. Unfortunately, some ways in which users access and/or share digital content lack a user feedback mechanism, or could benefit from an improved user feedback mechanism, by way of which the users could provide feedback about the digital content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
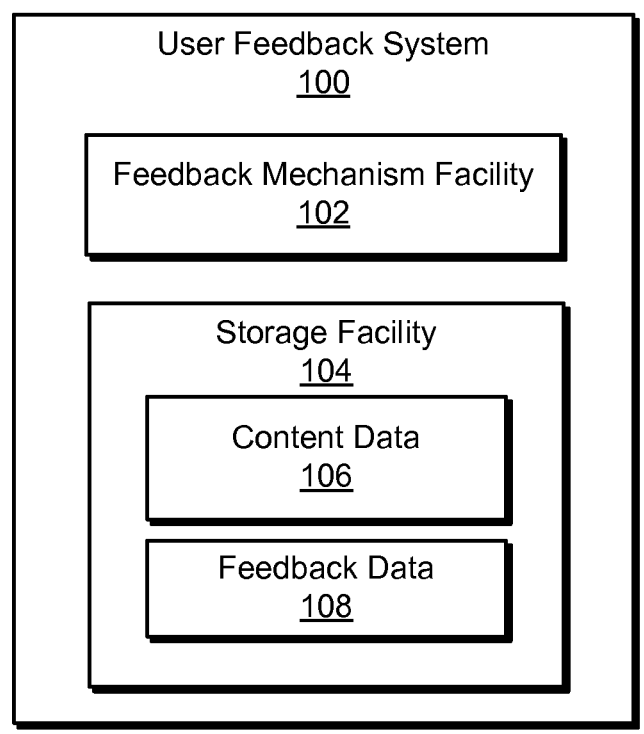
FIG. 1 illustrates an exemplary user feedback system according to principles described herein.

Exemplary user feedback systems and methods are disclosed. In certain examples, systems and methods described herein may provide a dynamic, real-time feedback mechanism that allows users of computing devices to provide feedback regarding digital content.

As used herein, the term "digital content" may refer to any still-image (e.g., a picture, a photograph, etc.), video content (e.g., video clips, movies, etc.), audio content (e.g., songs, audio recordings, audio clips, etc.), hyperlink to additional digital content, advertisement, ring-back content (e.g., audio ring-back content, video ring-back content, still-image ring-back content, etc.), and/or any other content that may be processed by a computing device (e.g., received, accessed, transmitted, output, shared, etc. by the computing device). In certain examples, "digital content" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, audio program, radio program, or any other digital content that a user may access and/or share by way of a computing device. In certain examples, "digital content" may refer to any website, computer-executable application (e.g., a stand-alone mobile application), text message, voice message, video message, social media posting, and/or any other digital content that a user may access and/or share by way of a computing device. Such digital content may be sent to, accessed by, played back, and/or otherwise processed by an appropriately configured computing device for presentation to a user.

Such digital content may be provided to a computing device over any suitable data communications connection(s) (e.g., via a communications network connection), from any suitable source, and using any suitable content transmission technologies. The computing device may receive and present the digital content for experiencing by a user of the computing device. Systems and methods described herein may provide a feedback mechanism that facilitates the user of the computing device providing feedback regarding the digital content. Data representative of the feedback may be provided, by way of the feedback mechanism, to any suitable computing device and/or entity. Specific examples of feedback mechanisms and how they may be provided are described herein.

Systems and methods described herein may facilitate an efficient and/or unobtrusive way for users to provide feedback regarding digital content. Systems and methods described herein may additionally or alternatively facilitate efficient ways for a provider of a media service and/or an advertiser to direct digital content to users in a manner that may result in receiving feedback from a user regarding with the digital content. These and/or additional or alternative benefits and/or advantages that may be provided by systems and methods described herein will be made apparent by the following description. Exemplary user feedback systems and methods will now be described in reference to the accompanying drawings.

FIG. 1 illustrates an exemplary user feedback system 100 ("system 100"). System 100 may be configured to collect user feedback regarding digital content. For example, system 100 may be configured to provide a feedback mechanism configured to facilitate a user of a computing device to provide feedback regarding digital content accessed and presented by the computing device. By way of the feedback mechanism, system 100 may receive and provide data representative of the feedback provided by the user to one or more feedback destinations, such as to another computing device. In certain examples, system 100 may provide the feedback mechanism to facilitate one or more end-users of a service (e.g., a Voice-over-Internet Protocol ("VOIP") communications service, a mobile communications service, a media content provider service, etc.) to provide feedback regarding digital content accessed through the service. System 100 may be associated with (e.g., operated by) a provider of the service ("service provider") or some other entity (e.g., a third party).

As shown in FIG. 1, system 100 may include, without limitation, a feedback mechanism facility 102 ("feedback facility 102") and a storage facility 104 selectively and communicatively coupled to one another. Facilities 102 and 104 may be communicatively coupled one to another by any suitable communication technologies.

It will be recognized that although facilities 102 and 104 are shown to be separate facilities in FIG. 1, the facilities 102 and 104 may be combined into a single facility or split into additional facilities as may serve a particular implementation. Additionally or alternatively, one or more of the facilities 102 and 104 may be omitted from and external to system 100 in other implementations. For example, storage facility 104 may be external of system 100 and in some alternative implementations. Facilities 102 and 104 will now be described in more detail.

Storage facility 104 may be configured to store content data 106 representative of digital content and/or any information associated with the digital content (e.g., information about a source of the digital content, ratings information, etc.). In certain examples, content data 106 may represent information about digital content detected by feedback facility 102 as described herein. Storage facility 104 may also store feedback data 108 representative user feedback associated with the digital content and/or any information about the user feedback. For example, feedback data 108 may represent information regarding whether a user liked or disliked certain digital content provided to a computing device and/or any other suitable information.

Feedback facility 102 may be configured to perform one or more operations to collect user feedback regarding digital content, including one or more operations associated with providing a feedback mechanism that facilitates a user of a computing device (e.g., a mobile phone, a tablet computer, a laptop computer, etc.) providing feedback regarding digital content. Examples of such operations are described herein.

In certain examples, digital content may be provided to a computing device in conjunction with an establishment of a communication session between the computing device and one or more other computing devices (e.g., another computing device functioning as another endpoint of the communication session and one or more intermediary devices). As used herein, a "communication session" refers to a period of time during which a computing device is in reciprocal communication with one or more other computing devices.

A communication session may be established between computing devices in any suitable way and using any suitable communication session technologies. In certain examples, establishment of a communication session may utilize a communication session setup control protocol, which may include any suitable communication session setup control protocol (e.g., Session Initiation Protocol ("SIP"), Extensible Messaging and Presence Protocol ("XMPP"), Skinny Client Control Protocol ("SCCP"), etc.). Examples of how communication session setup control protocols may be used to establish communication sessions are provided herein.

Prior to a communication session being established, a connection period may occur during which there may be some back and forth communication between a computing device and one or more other computing devices to set up the communication session. As used herein, a "connection period" refers to a time period that starts when a computing device sends a request to establish a communication session and that substantially ends when the communication session begins. To illustrate, a computing device may initiate a connection period by sending a request either directly or indirectly to one or more other computing devices indicating that the computing device wants to establish a communication session. The request to establish the communication session, which may be provided based on a specific user input or in any other suitable manner, may trigger one or more communications between the computing devices related to setup of the communication session.

In certain examples, during the connection period, a user associated with the one or more other computing devices may either accept or decline the request to participate in the communication session. If the user associated with the one or more other computing devices accepts the request, one or more communications between the computing devices may be performed to establish the communication session, thereby ending the connection period and beginning the communication session. If, on the other hand, the user associated with the one or more other computing devices declines the request, one or more communications between the computing devices may be performed to end the connection period either at the time that the request is declined or some amount of time thereafter.

During the connection period, the computing device may receive digital content in the form of ring-back content to be presented to a user by way of a computing device (e.g., for display on a display screen associated with the computing device). As used herein, "ring-back content" may include any digital content that may be presented by a computing device during a connection period. Such ring-back content may include, but is not limited to, advertisement ring-back content, audio ring-back content, video ring-back content, still-image ring-back content, or any other type of digital content that may be provided to a computing device during a connection period and/or presented by the computing device during the connection period. Specific examples of ring-back content are provided herein.

Ring-back content to be provided to the computing device during a connection period may be selected by any suitable entity and in any suitable manner. In certain examples, the ring-back content may be provided to the computing device based on a selection of the ring-back content by an entity associated with the one or more other computing devices. For example, a user associated with the one or more other computing devices may select a particular ring-back video to be provided for display on any computing device that requests establishment of a communication session with the one or more other computing devices. Alternatively, the ring-back content to be provided to the computing device may be selected by an entity (e.g., an advertiser, a mobile communications service provider, etc.) that is not directly associated with the one or more other computing devices. For example, such an entity may select the same ring-back content to be provided to any computing device requesting establishment of a communication session regardless of which computing device is the recipient of the request or based on one or more attributes of the computing device that is the recipient of the request.

The ring-back content may be provided to the computing device requesting establishment of the communication session by any suitable source communicatively coupled to the computing device. In certain examples, the ring-back content may be provided directly by the one or more other computing devices. Alternatively, the ring-back content may be provided to the computing device from an additional computing device (e.g., a switch, a router, a gateway, a cloud-based server, etc.) that is communicatively coupled to the first computing device and the one or more other computing devices.

In certain examples, feedback facility 102 may detect ring-back content provided to a computing device during a connection period. Feedback facility 102 may detect the ring-back content in any suitable manner. For example, feedback facility 102 may monitor digital content provided to the first computing device and determine that the digital content is ring-back content if the digital content is presented by the computing device for experiencing by a user of the computing device during a connection period. In certain examples, feedback facility 102 may begin monitoring for ring-back content in response to a start of the connection period (e.g., in response to a request to establish a communication session).

In conjunction with the detecting of the ring-back content provided to the first computing device, feedback facility 102 may provide a feedback mechanism that facilitates a user of the computing device providing feedback regarding the ring-back content. The feedback provided by way of the feedback mechanism may include any type of feedback that may be provided by a user regarding the ring-back content. For example, the feedback may include information regarding whether the user of the computing device liked or disliked the ring-back content. Additionally or alternatively, the feedback may include information about the user and/or about the user's interaction (or lack of interaction) with the ring-back content.

Feedback facility 102 may provide the feedback mechanism in any suitable manner. In certain examples, the providing of the feedback mechanism may include feedback facility 102 providing one or more user-selectable graphical objects (e.g., graphical objects representing user-selectable "like" and/or "dislike" options, "thumbs up" and/or "thumbs down" options, etc.) that facilitate a user of a computing device providing feedback regarding the ring-back content. Feedback facility 102 may provide the one or more graphical objects in any suitable way. For example, the one or more graphical objects may be concurrently displayed with the ring-back content on a display screen of a computing device, such as by concurrently displaying the ring-back content and the one or more graphical objects on different portions of the display screen, overlaying the one or more graphical objects on the ring-back content, overlaying the ring-back content on the one or more graphical objects, displaying the ring-back content with the one or more graphical objects integrated therein, displaying the one or more graphical objects behind a transparent portion of the ring-back content, and/or by concurrently displaying the one or more graphical objects and the ring-back content on the display screen in any other suitable way.

Additionally or alternatively, the providing of the feedback mechanism may include feedback facility 102 collecting information associated with the user of the computing device and submitting the information, as part of the feedback, for example, to a third party (e.g., an advertiser, media content service provider, etc.) to be used for any suitable purpose. For example, the information may be used by the third party to provide future ring-back content that is specifically tailored to the user.

In certain examples, the providing of the feedback mechanism may include feedback facility 102 leveraging a specific communication session setup control protocol or any other suitable network communication protocol to provide data representative of the feedback to one or more entities. Specific examples of how feedback facility 102 may leverage a communication protocol to provide a feedback mechanism are provided herein.

Data representative of the feedback may be transmitted, by way of the feedback mechanism, to one or more entities for any suitable purpose. In certain examples, the feedback may be sent directly or indirectly to the one or more other computing devices during or after the communication session. In this manner, a user of the one or more other computing devices may be readily apprised of how the ring-back content was received by the user of the computing device. Additionally or alternatively, the feedback may be provided to an advertiser, an analytics server, a media content service provider, and/or any other entity to be used for any suitable purpose. Examples of how data representative of the feedback may be provided to and/or used by various entities are described herein.

Figure 2:
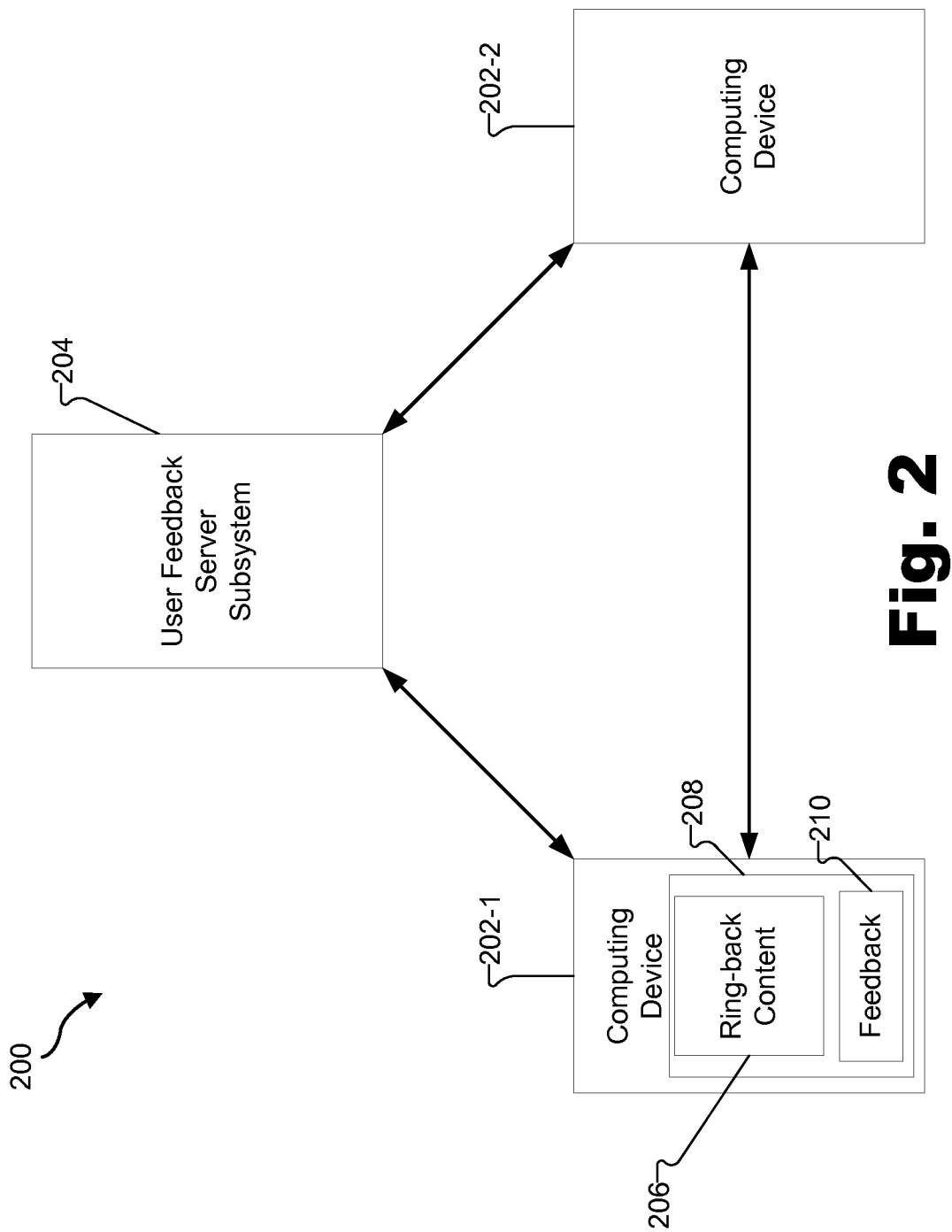
FIG. 2 illustrates an exemplary user feedback configuration in which the user feedback system of FIG. 1 may be implemented according to principles described herein.

FIG. 2 shows an exemplary feedback configuration 200 according to principles described herein. As shown in FIG. 2, feedback configuration 200 may include computing devices 202 (e.g., computing devices 202-1 and 202-2) and a user feedback server subsystem 204 ("server subsystem 204") that are communicatively coupled to each other. A user associated with computing device 202-1 may want to establish a communication session with a user or entity associated with computing device 202-2 (e.g., by initiating a voice call, a VOIP call, a video call, etc.). Accordingly, in response to any suitable user input, computing device 202-1 may send a request, in any suitable manner, to computing device 202-2 to establish the communication session. The request may be sent by computing device 202-1 either directly or indirectly to computing device 202-2. As described herein, the sending of the request may trigger a start of a connection period during which one or more operations related to setup of the communication session may be performed.

During the connection period, ring-back content 206 may be provided to computing device 202-1 for display on a display screen 208 associated with computing device 202-1. Server subsystem 204 and/or computing device 202-1 may detect ring-back content 206 in any suitable manner and may provide a feedback mechanism to facilitate the user of computing device 202-1 providing feedback regarding ring-back content 206.

In the example shown in FIG. 2, the feedback mechanism may include a graphical object 210, displayed on display screen 208, configured to facilitate the user of computing device 202-1 providing feedback regarding the ring-back content 206. FIG. 2 depicts graphical object 210 being positioned below ring-back content 206 on display screen 208. However, graphical object 210 may be displayed together with ring-back content 206 in any suitable way, such as described herein.

Server subsystem 204 and/or computing device 202-1 may detect any suitable user input associated with graphical object 210 and provide feedback representative of the user input to any suitable entity using any suitable communications technologies. As described herein, the feedback mechanism may further include a way for data representative of the feedback to be provided by computing device 202-1 and/or server subsystem 204 to computing device 202-2 or a different computing device.

Server subsystem 204 and computing devices 202 may communicate using any communication platforms and technologies suitable for transporting data (e.g., digital content data such as ring-back content data, user feedback data, etc.) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), SIP, SCCP, XMPP, Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Long Term Evolution ("LTE") technologies, Multimedia Message Service ("MMS"), radio frequency ("RF") signaling technologies, wireless communication technologies, Internet communication technologies, digital content streaming technologies, digital content download technologies, and other suitable communications technologies.

In certain embodiments, server subsystem 204 and computing devices 202 may communicate via a network. The network may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data and/or communications signals between server subsystem 204 and computing devices 202 (including directly or indirectly between computing devices 202). Communications between server subsystem 204 and computing devices 202 may be transported using any one of the above-listed networks, or any combination or sub-combination of the above-listed networks. Alternatively, server subsystem 204 and computing devices 202 may communicate in another way such as by direct connections between server subsystem 204 and computing devices 202. In certain examples, computing devices 202 may communicate in another way such as by direct connections between themselves (e.g., a direct connection between computing device 202-1 and computing device 202-2).

In certain embodiments, system 100 may be implemented entirely by server subsystem 204 or entirely by either one of computing devices 202. In other embodiments, components of system 100 may be distributed across server subsystem 204 and computing devices 202. Server subsystem 204 may be implemented by one or more appropriately configured computing devices as may serve a particular implementation. Computing devices 202 may include any suitable user computing devices that may be connected one to another in a manner that supports establishment, maintenance, and teardown of a communication session and that may function as endpoints of the communication session. For example, computing devices 202 may include mobile devices (e.g., mobile phone devices, smartphone devices, tablet computers, etc.) phone devices (e.g., VOIP devices, video phone devices, etc.), computers, and/or any of the suitable user computing devices.

Figure 3:
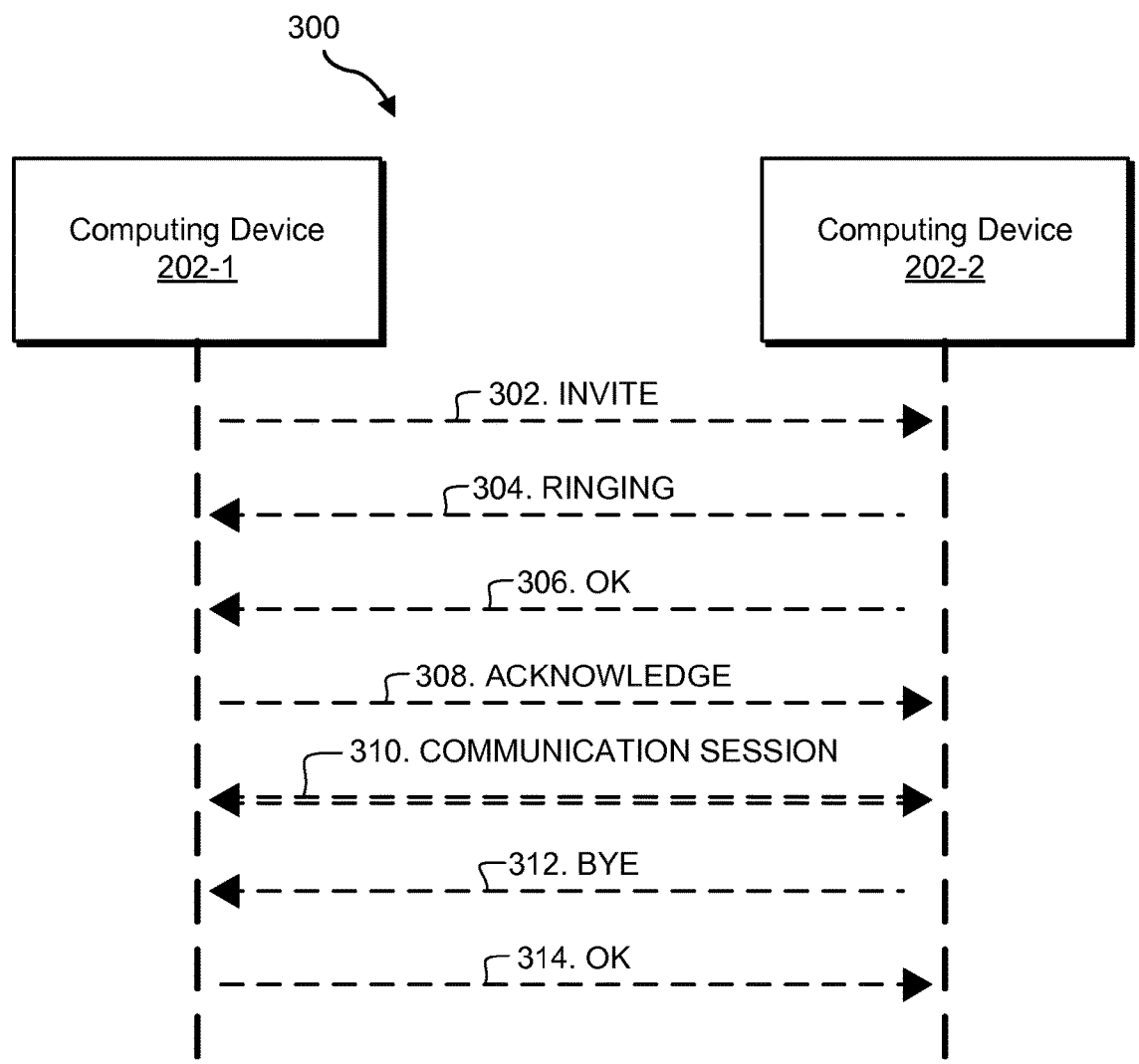
FIG. 3 illustrates an exemplary protocol for establishing a communication session according to principles described herein.

As mentioned, in certain examples, a computing device may utilize a communication session setup control protocol to establish a communication session with one or more other computing devices. To illustrate, FIG. 3 depicts an exemplary communication session setup control protocol 300 in which a request and response model may be utilized to set up and manage a communication session between computing device 202-1 and computing device 202-2. In the example shown in FIG. 3, arrow 302 represents a transmission of an invite from computing device 202-1 to computing device 202-2 requesting establishment of a communication session. Arrow 304 represents a ringing notification sent to computing device 202-1 indicating that computing device 202-2 has received the request. Although arrow 304 shows the ringing notification originating from computing device 202-2, the ringing notification may alternatively be sent by any other device (e.g., a network device) and/or entity (e.g., a mobile communications service provider, a media content provider, etc.). Arrow 306 represents an indication that computing device 202-2 has accepted the invite to establish the communication session. Arrow 308 represents a confirmation of reliable message exchanges. Arrows 310 represent an established two-way communication session between computing device 202-1 and computing device 202-2. Arrow 312 represents a termination of the communication session between computing device 202-1 and computing device 202-2. Arrow 314 represents an indication from computing device 202-1 that the request to terminate the communication session was successful.

In the example illustrated in FIG. 3, the connection period may occur during a time period beginning from when the invite represented by arrow 302 is sent by computing device 202-1 and ending when the communication session represented by the arrows 310 begins. During the connection period, ring-back content may be provided to computing device 202-1 instead of or in addition to the ringing notification represented by arrow 304 in FIG. 3.

Figure 4:
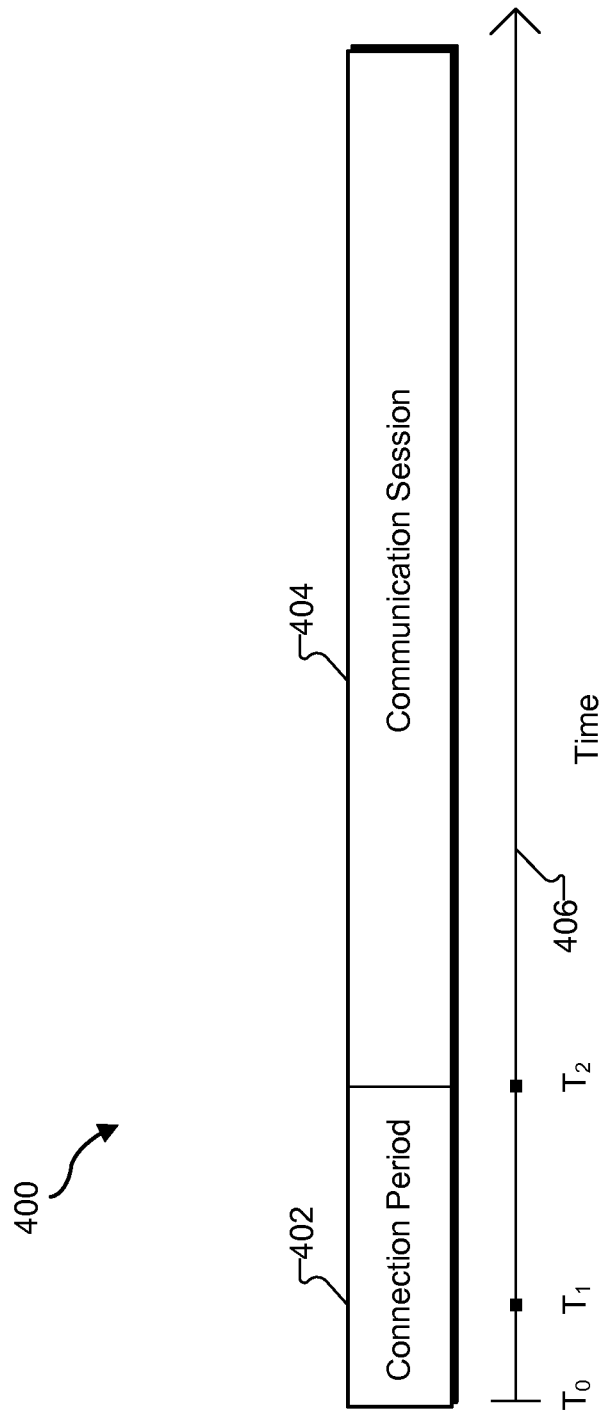
FIG. 4 illustrates an exemplary communication session timeline according to principles described herein.

A duration of the connection period may vary depending on how quickly a user associated with computing device 202-2 accepts or declines the request to establish a communication session. If the user associated with computing device 202-2 accepts or declines the request too quickly, a user associated with computing device 202-1 may not receive all of the ring-back content and/or may not have sufficient time to provide feedback regarding the ring-back content. Accordingly, in certain examples, feedback facility 102 may extend a duration of the connection period such that at least a minimum amount of the ring-back content is provided to computing device 202-1 prior to ending the connection period (e.g., prior to beginning the communication session). To illustrate, FIG. 4 depicts an exemplary communication session timeline 400 that includes a connection period 402 disposed temporally prior to a communication session 404 along a time axis 406. In the example shown in FIG. 4, connection period 402 may begin at time $T_0$ when a user associated with computing device 202-1 requests establishment of a communication session. During connection period 402, the user associated with communication device 202-2 may accept the request to establish the communication session at time $T_1$. However, the duration of time between time $T_0$ and time $T_1$ may not be sufficient to provide at least a minimum amount of ring-back content to computing device 202-1. For example, the time between time $T_0$ and time $T_1$ may not be sufficient to provide all of a ring-back video or advertisement for experiencing by the user of computing device 202-1. Accordingly, feedback facility 102 may extend a duration of connection period 402 to time $T_2$ such that at least a minimum amount of the ring-back content is provided to computing device 202-1 prior to ending connection period 402 (e.g., prior to beginning communication session 404).

Feedback facility 102 may extend a duration of connection period 402 in any suitable manner. For example, feedback facility 102 may insert a certain amount of delay in communications between computing device 202-1 and computing device 202-2 during the connection period 402. This may be accomplished by feedback facility 102 directing computing device 202-2 to add a certain amount of lag time before communication session 404 is established. To illustrate, there may be a base lag time of twenty seconds to establish a communication session. However, the ring-back content may include thirty seconds of content. Accordingly, feedback facility 102 may direct computing device 202-2 to add ten seconds of lag time after the user accepts or declines the request to ensure that a minimum amount of ring-back content (e.g., thirty seconds of content) is provided to computing device 202-1 and/or presented to the user of computing device 202-1.

In certain examples, feedback facility 102 may extend a duration of a connection period such that at least a minimum amount of the ring-back content is provided to computing device 202-1 even when the user of computing device 202-2 declines the request to establish the communication session. To illustrate, the user of computing device 202-2 may decline the request at time $T_1$ in FIG. 4. Feedback facility 102 may then direct computing device 202-2 extend a duration of connection period 402 to time $T_2$ (e.g., by delaying sending of a notification that the request was declined) such that at least a minimum amount of the ring-back content is provided to computing device 202-1 and/or presented to the user of computing device 202-1 prior to the end of connection period 402.

Figure 5:
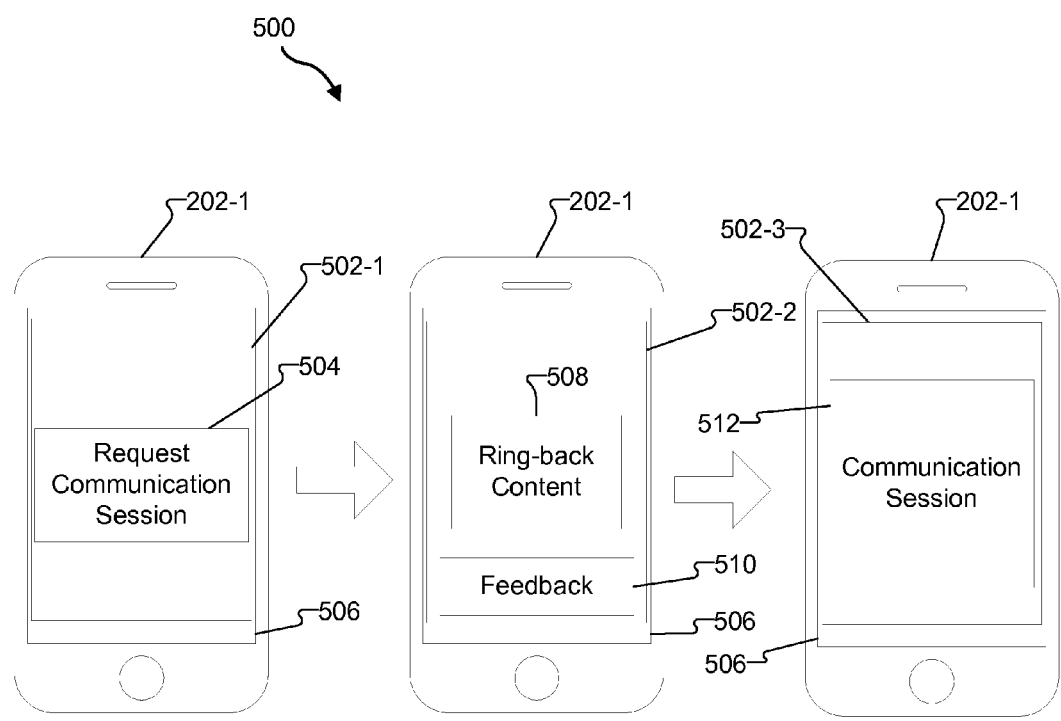
FIG. 5 illustrates exemplary graphical user interface views according to principles described herein.

During and/or after the ring-back content is provided to computing device 202-1, feedback facility 102 may detect the ring-back content and provide a feedback mechanism in any suitable manner, such as described herein. In certain examples, feedback facility 102 may provide the feedback mechanism by providing for display on a display screen associated with the computing device 202-1, a user-selectable graphical object to facilitate the user of computing device 202-1 providing feedback regarding the ring-back content. To illustrate, FIG. 5 shows a progression 500 of exemplary graphical user interface views (e.g., views 502-1 through 502-3) that may be provided for display on a display screen 506 of computing device 202-1. In the example shown in FIG. 5, computing device 202-1 is illustrated as a mobile computing device (e.g., a smartphone). However, computing device 202-1 may correspond to any type of computing device, such as described herein.

When a user utilizes computing device 202-1 to request establishment of a communication session, the user may be presented with view 502-1. As shown in FIG. 5, view 502-1 may include a request communication session graphical object 504 ("graphical object 504") provided for display on display screen 506. Graphical object 504 may be implemented in any suitable manner. For example, graphical object 504 may correspond to a native call interface of computing device 202-1 such as a keypad that may be used, for example, to dial a telephone number. Alternatively, graphical object 504 may be provided for display on display screen 506 by way of a mobile application or web portal associated with an entity that provides a communication service (e.g., a VOIP service).

After the user enters any suitable user input with respect to graphical object 504, computing device 202-1 may send a request to establish a communication session with another computing device (e.g., computing device 202-2). After computing device 202-1 sends the request, the user may be presented with view 502-2 during a connection period between sending the request and a beginning of the communication session. As shown in FIG. 5, view 502-2 may include ring-back content 508 and a feedback graphical object 510. Ring-back content 508 and feedback graphical object 510 may be provided for display on display screen 506 in any suitable manner, such as described herein. For example, feedback graphical object 510 may include a user-selectable "thumbs up" option and/or "thumbs down" option that a user may select to provide feedback regarding ring-back content 508.

After ring-back content 508 is provided for display on display screen 506 and the communication session has been established, the user may be presented with view 502-3. As shown in FIG. 5, view 502-3 may include a communication session graphical object 512 ("graphical object 512") provided for display on display screen 506. Graphical object 512 may correspond to any suitable interface or view that may be provided for display on display screen 506 during a communication session. For example, graphical object 512 may include timing information, user information, and/or any other information that may be association with the communication session. In examples where the communication session includes a video communication session, graphical object 512 may include one or more sections depicting live video feeds during the communication session. Specific examples of ring-back content and how the ring-back content may be provided to a computing device will now be explained.

In certain examples, ring-back content 508 may include video ring-back content. The video ring-back content may include any type of video content (e.g., a music video, a user-generated video, a news clip, a movie clip, etc.) that may be provided for display on a display screen associated with computing device 202-1. The video ring-back content may be selected by a user associated with computing device 202-2 or by any other entity. To illustrate, a user associated with computing device 202-2 may select a particular music video to be provided as video ring-back content for display on computing device 202-1 when any computing device requests establishment of a communication session with computing device 202-2. During a connection period associated with setup of the communication session, the music video may be automatically provided for display on display screen 506. Feedback facility 102 may detect, in any suitable manner, that the music video is provided for display on display screen 506 and provide a feedback mechanism to facilitate the user of computing device 202-1 providing feedback regarding the music video.

In certain examples, ring-back content 508 may include a website of an entity associated with computing device 202-2. For example, a user associated with computing device 202-1 may request establishment of a communication session with an entity (e.g., an individual, a business, a government entity, etc.) associated with computing device 202-2. Upon requesting establishment of the communication session, computing device 202-1 may automatically provide for display on display screen 506 a website of that entity during the connection period. To illustrate, the user of computing device 202-1 may make a voice call to a hardware store. During a connection period prior to beginning the voice call, a website associated with the hardware store may be automatically provided as ring-back content for display on display screen 506. Feedback facility 102 may detect, in any suitable manner, that the website is provided for display on display screen 506 and provide a feedback mechanism to facilitate the user of computing device 202-1 providing feedback regarding the website of the hardware store.

In certain examples, ring-back content 508 may include a social media posting of an entity associated with computing device 202-2. The social media posting may include any type of content (e.g., texts, videos, photographs, etc.) that may be posted by way of a social media service (e.g., FACEBOOK, TWITTER, etc.). To illustrate, a user associated with computing device 202-1 may request establishment of a communication session with an entity (e.g., an individual, a business, a government entity, etc.) associated with computing device 202-2. During a connection period prior to beginning the communication session, computing device 202-1 may provide for display on display screen 506 a social media posting associated with that entity. In certain examples, the social media posting may correspond to a most recent social media posting by the entity. Alternatively, the social media posting may be a particular social media posting selected by the entity to be provided, as ring-back content, for display in conjunction with receiving a request to establish a communication session. To illustrate, the user of computing device 202-1 may request establishment of a video call with a computing device associated with a social media contact. During a connection period associated with the video call, a photograph that the social media contact posted through a social media service may be automatically provided for display on display screen 506. Feedback facility 102 may detect, in any suitable manner, that the photograph is provided for display on display screen 506 and provide a feedback mechanism to facilitate the user of computing device 202-1 providing feedback regarding the photograph.

In certain examples, ring-back content 508 may include a ring-back advertisement provided for display on a display screen 506 associated with computing device 202-1. For example, a user associated with computing device 202-1 may request establishment of a communication session with an entity (e.g., an individual, a business, a government entity, etc.) associated with computing device 202-2. After computing device 202-1 requests establishment of the communication session, an advertisement may be automatically provided, as ring-back content, for display on display screen 506. The advertisement may correspond to any type of advertisement (e.g., a targeted advertisement, an interactive advertisement, etc.) that may be provided to a computing device. In certain examples, the advertisement may be provided as part of a targeted advertisement campaign directed towards the user of computing device 202-1. Additionally or alternatively, the advertisement may be directly associated with the entity associated with computing device 202-2. For example, the user associated with computing device 202-1 may make a voice call to place a delivery order at a pizza restaurant. During a connection period, an advertisement associated with the pizza restaurant may be automatically provided for display on display screen 506. Feedback facility 102 may detect, in any suitable manner, that the advertisement is provided, as ring-back content, for display on display screen 506 and provide a feedback mechanism to facilitate the user providing feedback regarding the advertisement. In certain examples, the feedback mechanism may also be configured to facilitate the user associated with computing device 202-1 to redeem a benefit (e.g., a coupon, a discount, etc.) associated with the advertisement.

In certain examples, ring-back content 508 may include a computer-executable application of an entity associated with computing device 202-2. For example, a user associated with computing device 202-1 may request establishment of a communication session with an entity (e.g., an individual, a business, a government entity, etc.) associated with computing device 202-2. After computing device 202-1 requests establishment of the communication session, computing device 202-1 may automatically launch an application (e.g., a mobile application) of that entity on display screen 506. To illustrate, the user of computing device 202-1 may make a voice call to a customer service department of a financial institution (e.g., a bank). During a connection period associated with the voice call, an application associated with the financial institution may be automatically launched by computing device 202-1, which may include displaying a graphical user interface of the application on display screen 506. Feedback facility 102 may detect that the application graphical user interface is provided for display on display screen 506 and provide a feedback mechanism to facilitate the user of computing device 202-1 providing feedback regarding the application associated with the financial institution.

The specific examples of ring-back content described above are provided for illustrative purposes only. It is understood that any other type of ring-back content may be provided to a computing device during a connection period in other implementations.

During and/or after the ring-back content is provided to computing device 202-1, the ring-back content is presented to a user of computing device 202-1, and user feedback regarding the ring-back content is received, the feedback mechanism provided by feedback facility 102 may be used to transmit data representative of the feedback in any suitable manner and to any suitable entity. Exemplary feedback mechanisms that may be provided by feedback facility 102 and used to transmit data representative of the feedback to an entity will now be described.

Figure 6:
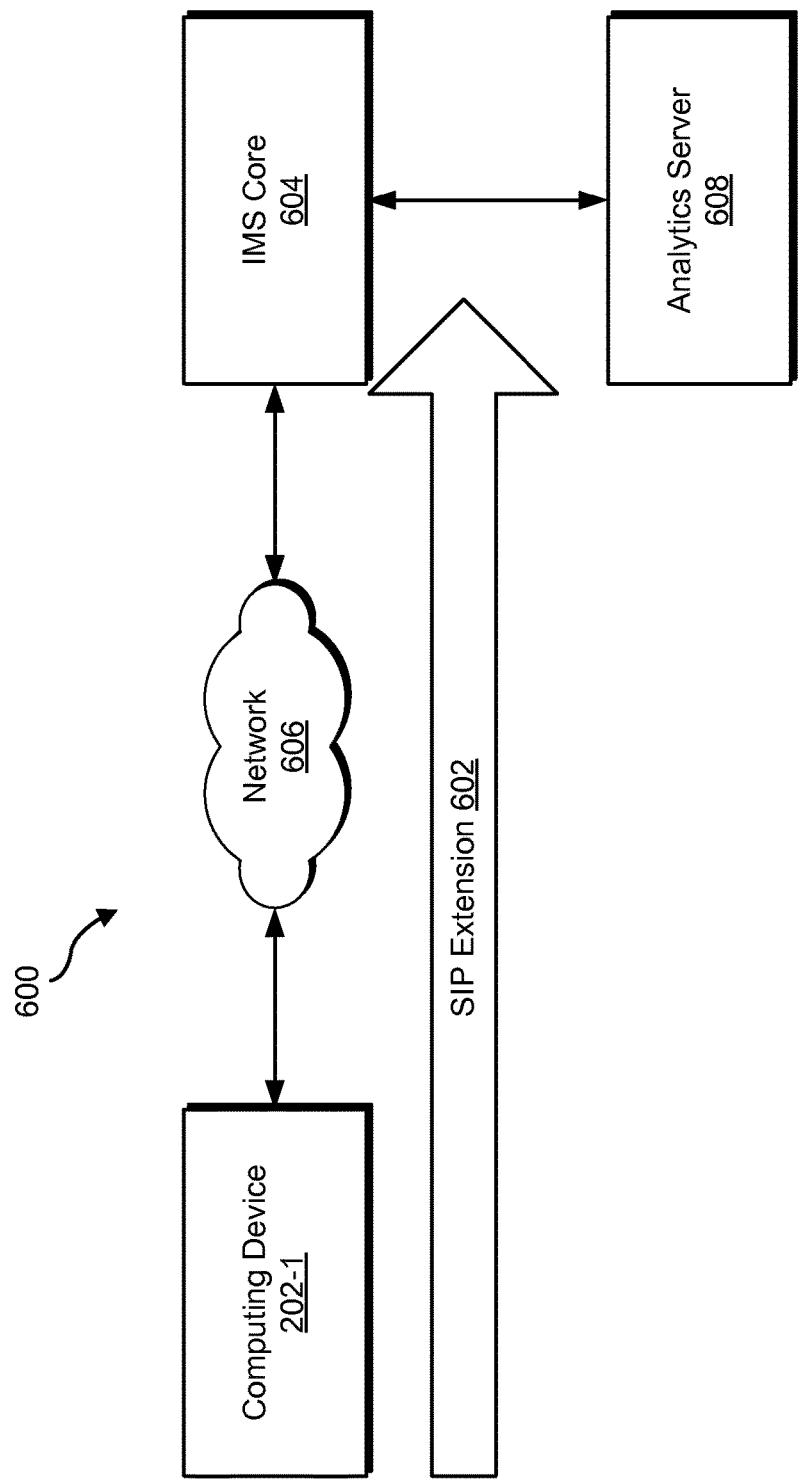
FIGS. 6-7 illustrate exemplary implementations of the system of FIG. 1 according to principles described herein.

In certain examples, the providing of a feedback mechanism may include feedback facility 102 establishing an extension in a communication session setup control protocol used to set up the communication session. To illustrate, FIG. 6 depicts an exemplary implementation 600 in which SIP is used as the communication session setup control protocol and a SIP extension 602 is used to provide (i.e., transmit) data representative of the feedback regarding the ring-back content to one or more entities. Any suitable SIP extension (e.g., MESSAGE, INFO, etc.) may be used to transmit the feedback. As shown in FIG. 6, SIP extension 602 may be used to transmit the feedback to an IP multimedia subsystems ("IMS") core 604 by way of a network 606. IMS core 604 may correspond to a network architectural framework for delivering digital content to computing devices (e.g., mobile devices). In certain examples, IMS core 604 may use Internet Protocol version 6 ("IPv6") for transport and may support multiple types of access including, but not limited to, wired access, wireless access, fiber optics access, and access through private networks. Network 606 may correspond to any suitable network, including an access network such as any of those described herein. In certain examples, network 606 may include an LTE network, and, in such an example, IMS core 604 may serve as a foundation and/or core for the LTE network.

After IMS core 604 receives data representative of the feedback by way of SIP extension 602, IMS core 604 may then transmit the data representative of the feedback, in any suitable manner, to an analytics server 608 to be used for any suitable purpose. For example, analytics server 608 may store the feedback and/or provide the feedback to one or more additional computing devices (e.g., computing device 202-2). In certain examples, analytics server 608 may provide the feedback to one or more third parties for market research. For example, analytics server 608 may provide the feedback and/or one or more reports generated based on the feedback to advertisers as part of a paid-for service through which the advertisers may use the feedback and/or reports to generate and/or modify advertisement campaigns. In other examples, analytics server 608 may make the feedback and/or one or more reports generated based on the feedback to a user of computing device 202-2.

SIP extension 602 and/or other SIP signaling may utilize any suitable signaling protocol and/or technologies. For example, SIP extension 602 and/or other SIP signaling may be transmitted on any suitable IMS signaling protocol, such as quality of service ("QoS") class identifier ("QCI") signaling protocol (e.g., QCI 5).

While FIG. 6 illustrates a particular implementation and/or use of a particular feedback mechanism, the example is illustrative only. As another example, IMS core 604 may be omitted or replaced by a suitable substitute (e.g., any network service provider's IP services) in other implementations. As another example, another communications protocol may be used by a feedback mechanism to transport data representative of user feedback in other implementations.

In certain examples, the providing of the feedback mechanism may include feedback facility 102 transmitting data representative of the feedback regarding the ring-back content by way of an HTTP connection to any suitable entity. To this end, in certain examples, feedback facility 102 may facilitate establishing an HTTP connection between computing device 202-1 and at least one additional computing device. The HTTP connection may include any suitable form of HTTP connection, including a "best efforts" data transport connection. In certain examples, the HTTP connection may be opened using an access point name ("APN") of a gateway between networks, such as an APN of a gateway between a wireless mobile wide area network (e.g., an LTE network) and a proprietary or public IP network (e.g., the Internet).

Figure 7:
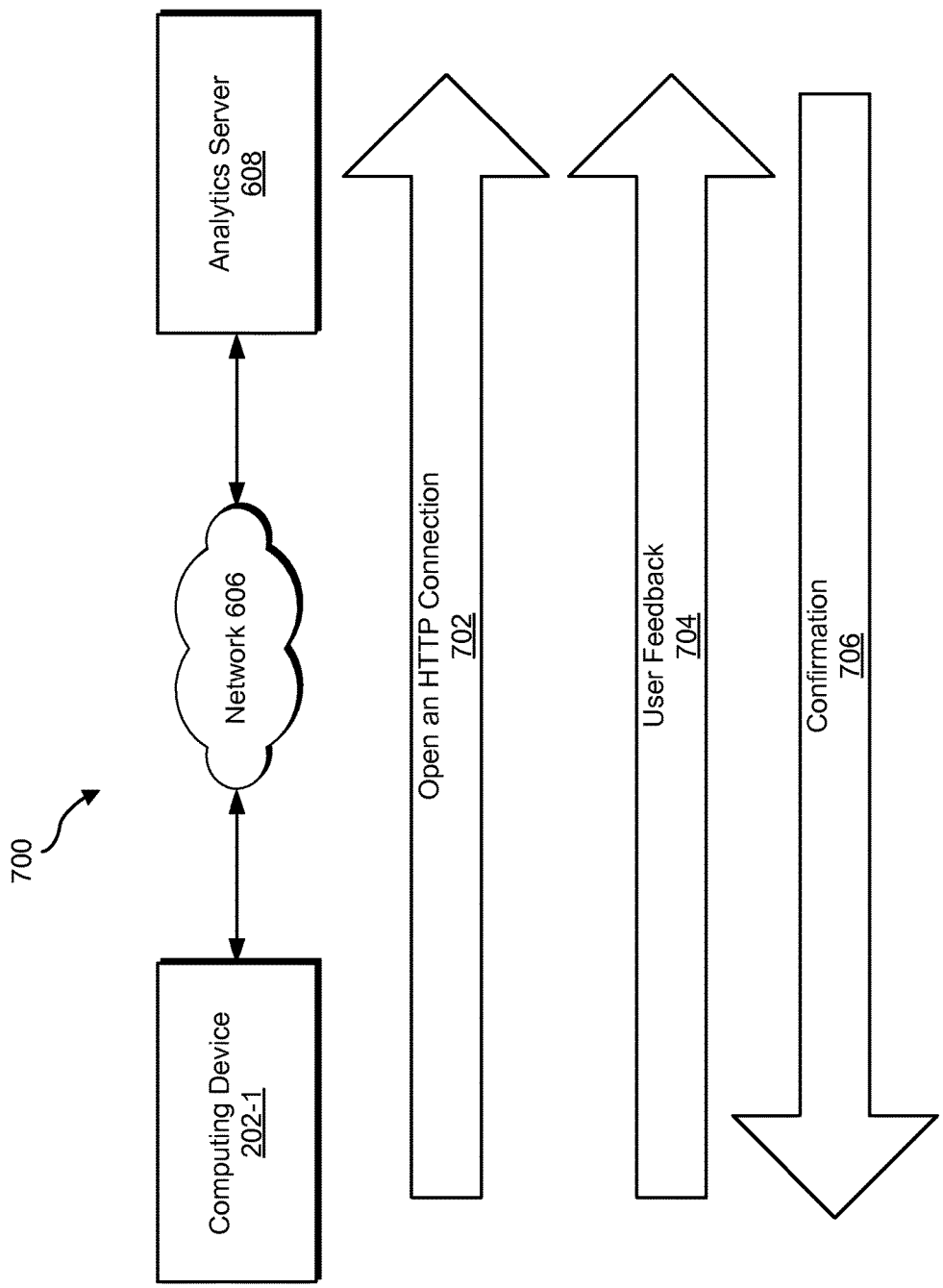

Feedback facility 102 may then transmit data representative of the feedback to the at least one additional computing device by way of the HTTP connection. To illustrate, FIG. 7 depicts an exemplary implementation 700 in which computing device 202-1 is communicatively coupled to analytics server 608 by way of network 606. Arrow 702 represented in FIG. 7 depicts an opening of an HTTP connection by feedback facility 102. Arrow 704 depicts data representative of the feedback being provided to analytics server 608 by way of the HTTP connection. The feedback may be provided by way of the HTTP connection in any suitable manner (e.g., through an HTTP "put" instruction). Arrow 706 depicts a confirmation being sent from analytics server 608 to computing device 202-1 indicating that the feedback was successfully received. Analytics server 608 may use the feedback in any suitable manner, such as described above with respect to FIG. 6.

Certain examples described above are presented in the context of providing a feedback mechanism to facilitate collection of user feedback regarding ring-back content. This is illustrative only and not limiting. One or more principles described herein are not limited to ring-back content implementations and may be applied in other suitable implementations in which digital content is provided to and/or accessed by a computing device. For example, one or more principles described herein may be utilized to provide a feedback mechanism that facilitates a user of a computing device providing feedback in digital content distribution implementations (e.g., media content broadcast implementations, media content streaming implementations, and/or in any other suitable media distribution implementation). To illustrate an example, a user of a computing device may access a video distribution service to stream video content to the computing device. Prior to beginning streaming of the video content, the user may be presented with unsolicited additional digital content (e.g., advertisements, previews, etc.). Principles and methods such as those described herein may be utilized to provide a feedback mechanism that facilitates the user providing feedback regarding the additional digital content (e.g., specific to the additional digital content) and/or the video content.

Figure 8:
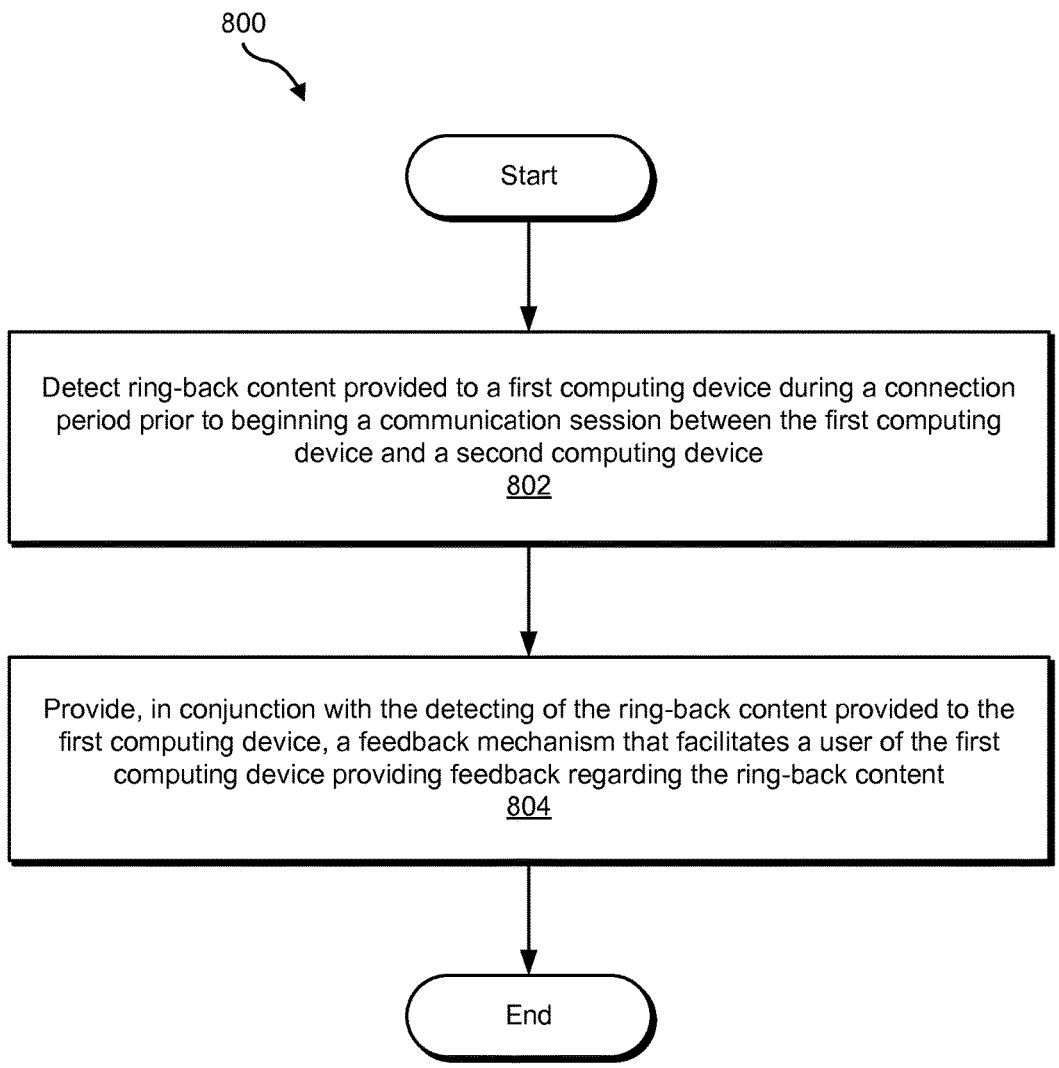
FIGS. 8-9 illustrate exemplary user feedback methods according to principles described herein.
Figure 9:
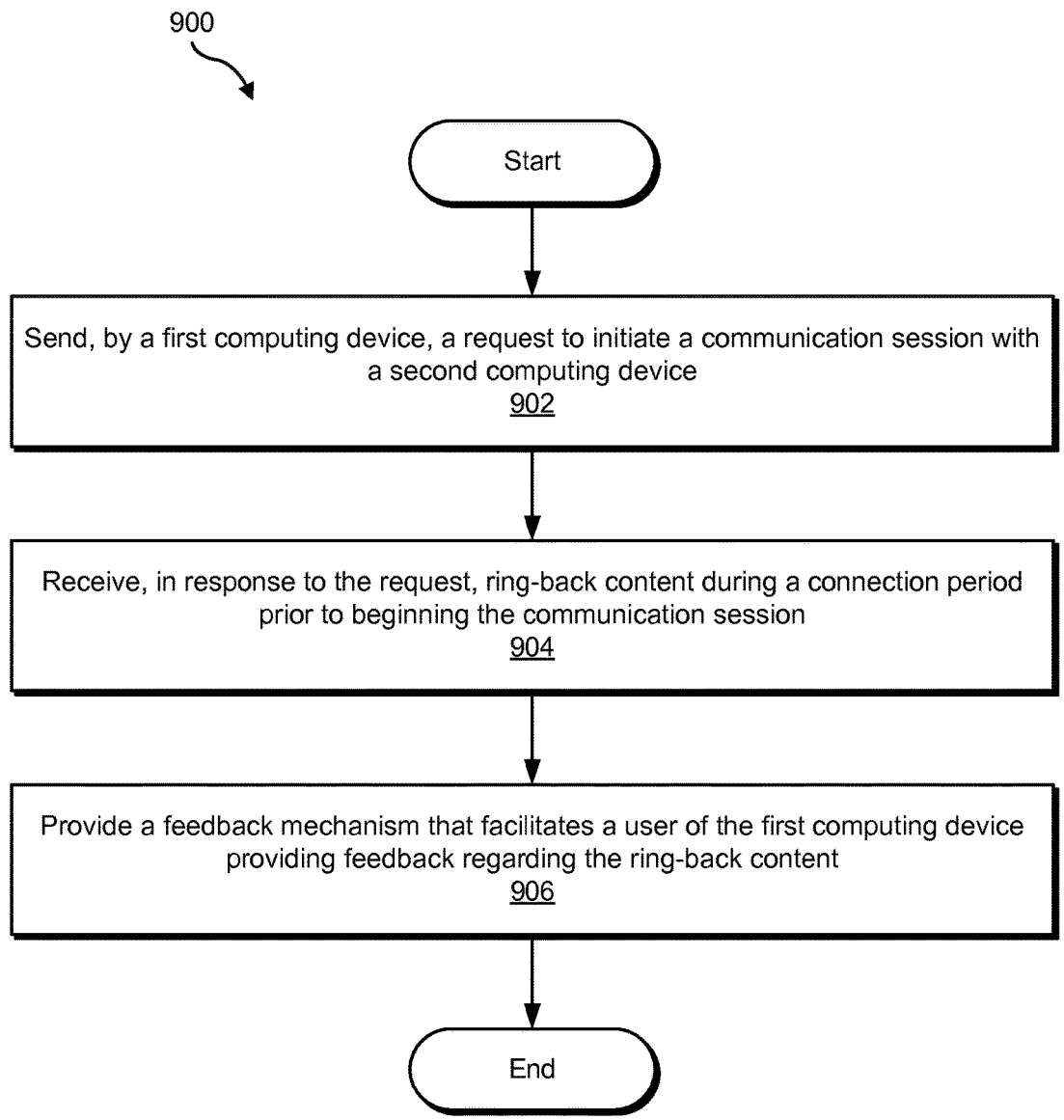

FIGS. 8-9 illustrate exemplary user feedback methods 800-900 that may be performed according to principles described herein. While FIGS. 8-9 illustrate exemplary steps according to certain embodiments, other embodiments may omit, add to, reorder, combine, and/or modify any of the steps shown in FIGS. 8-9. In certain embodiments, one or more of the steps shown in FIGS. 8-9 may be performed by system 100 and/or one or more components or implementations of system 100.

Turning to method 800 illustrated in FIG. 8, in step 802, a system (e.g., system 100) detects ring-back content provided to a first computing device during a connection period prior to beginning a communication session between the first computing device and a second computing device. Step 802 may be performed in any of the ways described herein.

In step 804, the system provides, in conjunction with the detecting of the ring-back content provided to the first computing device, a feedback mechanism that facilitates a user of the first computing device providing feedback regarding the ring-back content. Step 804 may be performed in any of the ways described herein.

Turning to method 900 illustrated in FIG. 9, in step 902, a first computing device (e.g., computing device 202-1) sends a request to initiate a communication session with a second computing device (e.g., computing device 202-2). Step 902 may be performed in any of the ways described herein.

In step 904, the first computing device receives, in response to the request, ring-back content during a connection period prior to beginning the communication session. Step 904 may be performed in any of the ways described herein.

In step 906, the first computing device provides a feedback mechanism that facilitates a user of the first computing device providing feedback regarding the ring-back content. Step 906 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 10:
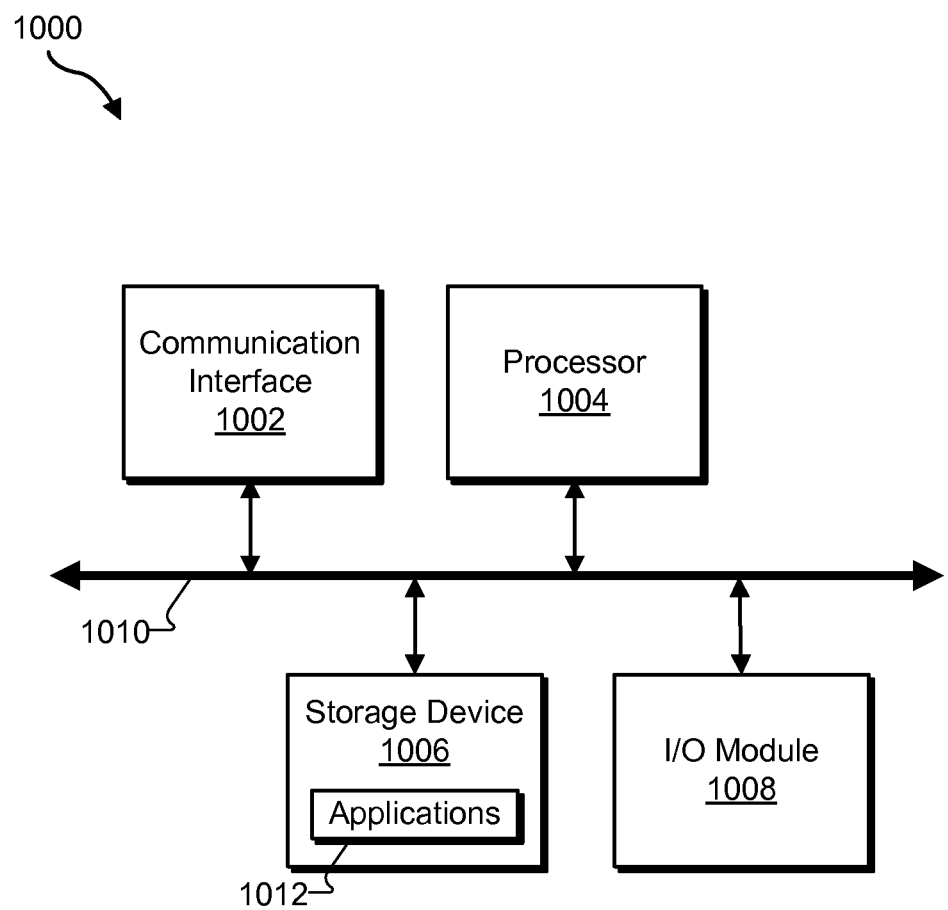
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output (I/O) module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. In at least one embodiment, communication interface 1002 may provide a direct connection between system 100 and one or more of provisioning systems via a direct link to a network, such as the Internet. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 906.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
    detecting, by a user feedback system, ring-back content provided to a first computing device during a connection period prior to beginning a communication session between the first computing device operated by a user and a second computing device operated by an additional user, the first computing device requesting initiation of the communication session between the first computing device and the second computing device; and
    providing, by the user feedback system in conjunction with the detecting of the ring-back content provided to the first computing device, a feedback mechanism that includes a user-selectable graphical object displaying the feedback mechanism on a display screen associated with the first computing device prior to beginning the communication session between the first computing device and the second computing device and wherein the feedback mechanism facilitates the user of the first computing device to provide feedback regarding the ring-back content.

2. The method of claim 1, wherein the providing of the feedback mechanism further includes:

establishing an extension in a communication session setup control protocol used to set up the communication session; and providing data representative of the feedback to at least one of the second computing device and an additional computing device by way of the extension.

3. The method of claim 1, wherein the providing of the feedback mechanism further includes:

establishing a Hypertext Transfer Protocol ("HTTP") connection between the first computing device and at least one of the second computing device and an additional computing device; and providing data representative of the feedback to the at least one of the second computing device and an additional computing device by way of the HTTP connection.

4. The method of claim 1, wherein the ring-back content is provided to the first computing device based on a selection of the ring-back content by an entity associated with the second computing device.

5. The method of claim 1, wherein the ring-back content is provided to the first computing device directly from the second computing device.

6. The method of claim 1, wherein the ring-back content is provided to the first computing device from an additional computing device that is communicatively coupled to the first computing device and the second computing device.

7. The method of claim 1, wherein the ring-back content includes at least one of video ring-back content, still-image ring-back content, and audio ring-back content.

8. The method of claim 1, wherein the ring-back content is provided for display on the display screen associated with the first computing device during the connection period and includes a website of an entity associated with the second computing device.

9. The method of claim 1, wherein the ring-back content is provided for display on the display screen associated with the first computing device during the connection period and includes a social media posting of an entity associated with the second computing device.

10. The method of claim 1, wherein the ring-back content includes a ring-back advertisement provided for display on the display screen associated with the first computing device during the connection period.

11. The method of claim 1, wherein the ring-back content includes a computer-executable application provided by an entity associated with the second computing device.

12. The method of claim 1, further comprising extending, by the user feedback system, a duration of the connection period such that at least a predefined minimum amount of the ring-back content is provided to the first computing device prior to beginning the communication session.

13. The method of claim 1, embodied as computer-executable instructions on at least one non-transitory computer-readable medium.

14. A method comprising:

sending, by a first computing device operated by a user, a request to initiate a communication session with a second computing device operated by an additional user;

receiving, by the first computing device in response to the request, ring-back content during a connection period prior to beginning the communication session; and providing, by the first computing device, a feedback mechanism that includes a user-selectable graphical object displaying the feedback mechanism on a display screen associated with the first computing device prior to beginning the communication session between the first computing device and the second computing device and wherein the feedback mechanism facilitates the user of the first computing device to provide feedback regarding the ring-back content.

15. The method of claim 14, wherein the providing of the feedback mechanism further includes:

establishing an extension in a communication session setup control protocol used to set up the communication session; and providing data representative of the feedback to at least one of the second computing device and an additional computing device by way of the extension.

16. The method of claim 14, wherein the providing of the feedback mechanism further includes:

establishing a Hypertext Transfer Protocol ("HTTP") connection to at least one of the second computing device and an additional computing device; and providing data representative of the feedback to the at least one of the second computing device and an additional computing device by way of the HTTP connection.

17. The method of claim 14, embodied as computer-executable instructions on at least one non-transitory computer-readable medium.

18. A system comprising:

at least one computing device that:

detects ring-back content provided to a first computing device, which is operated by a user, during a connection period prior to beginning a communication session between the first computing device and a second computing device operated by an additional user, the first computing device requesting initiation of the communication session between the first computing device and the second computing device; and provides, in conjunction with the detecting of the ring-back content provided to the first computing device, a feedback mechanism that includes a user-selectable graphical object displaying the feedback mechanism on a display screen associated with the first computing device prior to beginning the communication session between the first computing device and the second computing device and wherein the feedback mechanism facilitates the user of the first computing device to provide feedback regarding the ring-back content.

19. The system of claim 18, wherein the at least one computing device further provides the feedback mechanism by:

establishing an extension in a communication session setup control protocol used to set up the communication session; and providing data representative of the feedback to at least one of the second computing device and an additional computing device by way of the extension.

20. The method of claim 18, wherein the at least one computing device further provides the feedback mechanism by:

establishing a Hypertext Transfer Protocol ("HTTP") connection to at least one of the second computing device and an additional computing device; and providing data representative of the feedback to the at least one of the second computing device and an additional computing device by way of the HTTP connection.

\* \* \* \* \*